United States Patent
Pilkington et al.

(10) Patent No.: US 10,868,823 B2
(45) Date of Patent: Dec. 15, 2020

(54) SYSTEMS AND METHODS FOR DISCRIMINATING BETWEEN HUMAN AND NON-HUMAN INTERACTIONS WITH COMPUTING DEVICES ON A COMPUTER NETWORK

(71) Applicant: INTERSET SOFTWARE, INC., Santa Clara, CA (US)

(72) Inventors: Shaun Pilkington, Ottawa (CA); Maria Pospelova, Ottawa (CA); Stephan F. Jou, Richmond Hill (CA)

(73) Assignee: Interset Software Inc., Santa Clara, CA (US)

( * ) Notice: Subject to any disclaimer, the term of this patent is extended or adjusted under 35 U.S.C. 154(b) by 194 days.

(21) Appl. No.: 16/041,270

(22) Filed: Jul. 20, 2018

(65) Prior Publication Data

US 2019/0044965 A1   Feb. 7, 2019

Related U.S. Application Data

(60) Provisional application No. 62/540,720, filed on Aug. 3, 2017.

(51) Int. Cl.
*H04L 29/06* (2006.01)
*G06N 20/00* (2019.01)
*G06N 3/00* (2006.01)

(52) U.S. Cl.
CPC ......... *H04L 63/1425* (2013.01); *G06N 3/006* (2013.01); *G06N 20/00* (2019.01); *H04L 63/14* (2013.01); *H04L 63/1408* (2013.01); *H04L 63/1416* (2013.01); *H04L 63/1433* (2013.01); *H04L 63/20* (2013.01)

(58) Field of Classification Search
CPC ........ G06F 21/30; G06F 21/316; G06F 21/31; G06F 21/36; H04L 63/14; H04L 63/1408; H04L 63/1416; H04L 63/1433; H04L 63/1425
See application file for complete search history.

(56) References Cited

U.S. PATENT DOCUMENTS

2009/0241174 A1* 9/2009 Rajan .................. G06F 21/31
                                                                    726/5
2017/0235954 A1* 8/2017 Kurupati ........... H04L 29/06877
                                                                    726/23

* cited by examiner

*Primary Examiner* — Edward Zee

(57) ABSTRACT

Humans as well as non-human actors may interact with computer devices on a computer network. As described herein, it is possible to train and apply human vs. non-human detection models to provide an indication of the probability that a human or a non-human actor was interacting with a computer device during a particular time period. The probability that a human or non-human was interacting with computers during a particular time may be used to improve various actions, including selecting one or more different threat detection models to apply during the particular time, selecting data to use with threat detection models during the time, or selecting data from the particular time to store.

20 Claims, 8 Drawing Sheets

SYSTEMS AND METHODS FOR DISCRIMINATING BETWEEN HUMAN AND NON-HUMAN INTERACTIONS WITH COMPUTING DEVICES ON A COMPUTER NETWORK

RELATED APPLICATION

The current application claims priority to U.S. provisional patent application 62/540,720 filed Aug. 3, 2017, which is incorporated herein by reference in its entirety.

TECHNICAL FIELD

The current disclosure relates to network security and in particular to systems and methods for identifying a human or non-human as interacting with a computing device.

BACKGROUND

Within the cybersecurity domain, detection of various threats, such as an attack, a compromised account, a malware infection, data theft, fraud, etc. is often performed by analyzing datasets for evidence of those threats. There are many datasets such as, network related metadata, Active Directory logs, source code logs, etc. that may contain events that could come from humans interacting with a computer or from non-human agents interacting with a computer. For example, Active Directory logs may contain login and authentication events for user accounts for a human users as well as service accounts for non-human actors, such as operating system components; endpoint logs, which record events based on what is happening on a user's computer may contain application and file-access events resulting from human users interacting with the computer as well as from non-human actors, such as programs, interacting with the computer; source code logs, which record developers checking in and reading source code files, may contain records of source code theft either by a human or an automated script, such as an automated build system.

Currently, distinguishing human events from non-human events is either not done at all, or is based on hard-coded signatures or rules. For example, there may be an underlying assumption that all interactive logins within Active Directory records are the result of a human, as opposed to a malicious program masquerading as a human by programmatically performing interactive logins.

BRIEF DESCRIPTION OF THE DRAWINGS

Embodiments are described herein with reference to the appended drawings, in which.

DETAILED DESCRIPTION

Figure 1:
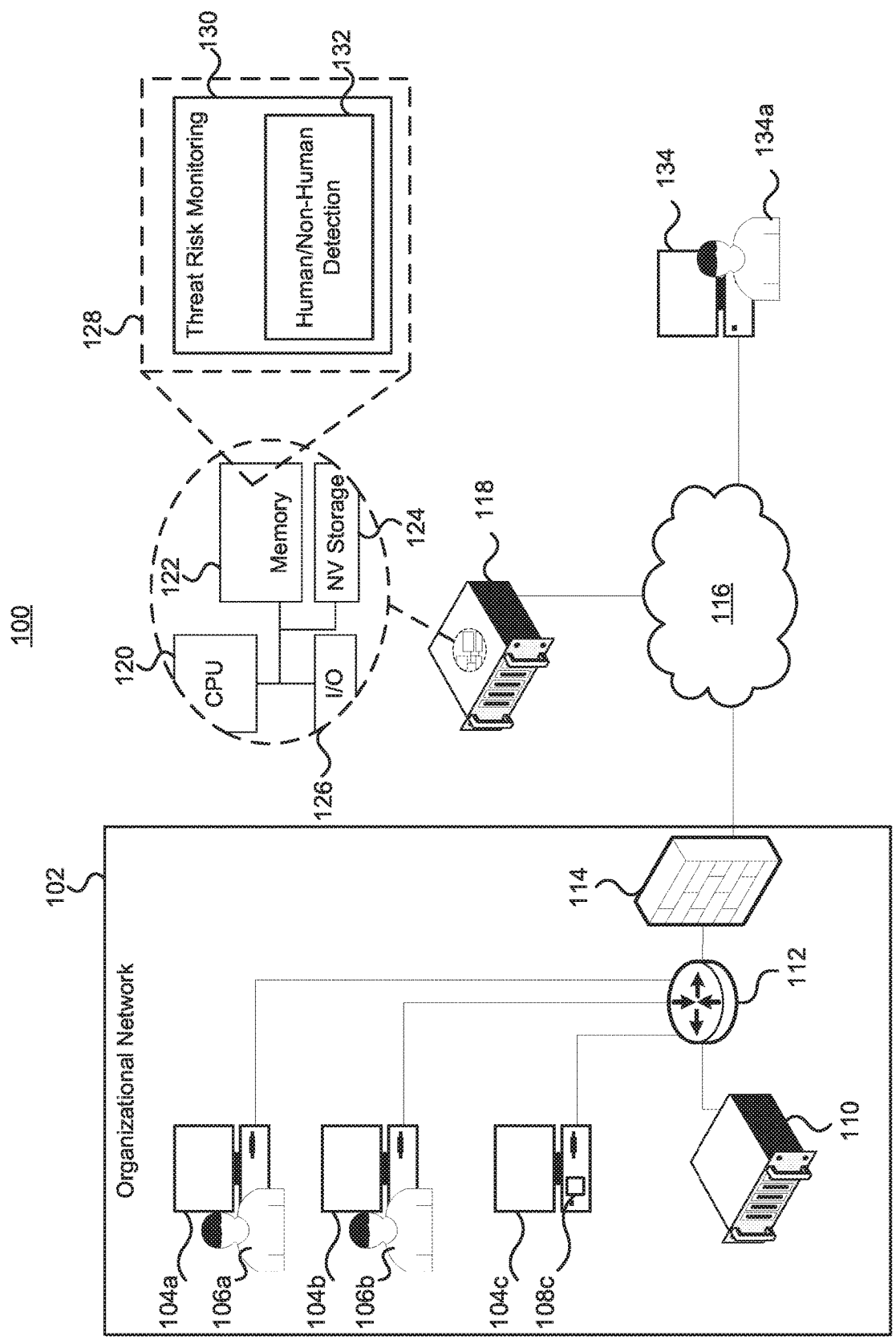
FIG. 1 depicts a network environment in which human vs non-human agent interactions may be distinguished.

In accordance with the present disclosure there is provided a method for discriminating between human and non-human interactions with computing devices on a computer network, the method comprising: receiving computer metadata associated with one or more computing devices on the computer network, the computer metadata comprising a plurality of security events, each security event including a unique identifier of a computing device or a user; for a monitoring time period, determining a presence probability by applying a presence estimation model to at least a portion of the computer metadata associated with a particular identifier of a computer device or user, the presence estimation model providing the presence probability that at least the portion of the computer metadata for the monitoring period of time was generated by interactions of a human versus a non-human actor; and performing an action based on the determined presence probability.

In accordance with a further embodiment of the method, performing the action comprises: selecting a risk threat detector to apply during the monitoring time based on the determined presence probability for the monitoring time period; applying the risk threat detector to security related metadata including at least a portion of the network metadata for the monitoring time period to determine a threat risk score associated with the computing device; and providing a security related notification according to the determined threat risk score.

In accordance with a further embodiment of the method, performing the action comprises: retrieving an account type in use during the monitoring time period; comparing an account type with the determined presence probability; based on results of the comparison, determining if an account type mismatch is possible; and performing a notification action if an account type mismatch is possible.

In accordance with a further embodiment of the method, performing the action comprises: filtering security event data based on the determined presence probability; and storing the filtered security event data.

In accordance with a further embodiment of the method, performing the action comprises: filtering security event data based on the determined presence probability; and applying a risk threat detector to the filtered security event data.

In accordance with a further embodiment, the method further comprises generating the presence estimation model using one or more of: supervised training; unsupervised training; and semi-supervised training.

In accordance with a further embodiment, the method further comprises generating the presence estimation model comprising: receiving computer metadata associated with one or more computing devices on the computer network, the computer metadata comprising a plurality of security events, each security event including a unique identifier of a computing device or a user; identifying within the received computer metadata a portion of the computer metadata originating from a particular identifier of a computing device or user; generating an initial presence estimate providing a probability that the portion of the computer metadata for the monitoring period of time was generated by interactions of a human versus non-human actor with the computing device during the monitoring period of time; determining one or more presence parameters from the computer metadata based on the presence estimate; updating the presence estimate using the determined one or more presence parameters; repeatedly determining one or more presence parameters and then updating the presence estimate using the determined one or more presence parameters until a termination criteria is reached; and storing the presence parameters defining a human/non-human presence estimation model.

In accordance with a further embodiment of the method, the termination criteria comprises one or more of: updating the presence estimate a threshold number of times; a variance of a presence estimate and the updated presence estimate is below a threshold variance amount; and repeatedly determining the one or more presence parameters and then updating the presence estimate for a threshold period of time.

In accordance with a further embodiment of the method, the security events comprise one or more of: login events; file access events; network traffic related events; firewall events; dynamic host control protocol (DHCP) events; domain name system (DNS) events; code management events; and human resource information system (HRIS) events.

In accordance with the present disclosure there is further provided a computer system for use in discriminating between human and non-human interactions with a computer device on a computer network, the computer system comprising: a memory for storing instructions and data; and a processing unit for executing instructions stored in the memory, the instructions when executed by the processing unit configuring the computer system to perform a method comprising: receiving computer metadata associated with one or more computing devices on the computer network, the computer metadata comprising a plurality of security events, each security event including a unique identifier of a computing device or a user; for a monitoring time period, determining a presence probability by applying a presence estimation model to at least a portion of the computer metadata associated with a particular identifier of a computer device or user, the presence estimation model providing the presence probability that at least the portion of the computer metadata for the monitoring period of time was generated by interactions of a human versus a non-human actor; and performing an action based on the determined presence probability.

In a further embodiment of the computer system, performing the action comprises: selecting a risk threat detector to apply during the monitoring time based on the determined presence probability for the monitoring time period; applying the risk threat detector to security related metadata including at least a portion of the network metadata for the monitoring time period to determine a threat risk score associated with the computing device; and providing a security related notification according to the determined threat risk score.

In a further embodiment of the computer system, performing the action comprises: retrieving an account type in use during the monitoring time period; comparing an account type with the determined presence probability; based on results of the comparison, determining if an account type mismatch is possible; and performing a notification action if an account type mismatch is possible.

In a further embodiment of the computer system, performing the action comprises: filtering security event data based on the determined presence probability; and storing the filtered security event data.

In a further embodiment of the computer system, performing the action comprises: filtering security event data based on the determined presence probability; and applying a risk threat detector to the filtered security event data.

In a further embodiment of the computer system, the executed instructions further configure the system to generate the presence estimation model using one or more of: supervised training; unsupervised training; and semi-supervised training.

In a further embodiment of the computer system, the executed instructions further configure the system to generate the presence estimation model by: receiving computer metadata associated with one or more computing devices on the computer network, the computer metadata comprising a plurality of security events, each security event including a unique identifier of a computing device or a user; identifying within the received computer metadata a portion of the computer metadata originating from a particular identifier of a computing device or user; generating an initial presence estimate providing a probability that the portion of the computer metadata for the monitoring period of time was generated by interactions of a human versus non-human actor with the computing device during the monitoring period of time; determining one or more presence parameters from the computer metadata based on the presence estimate; updating the presence estimate using the determined one or more presence parameters; repeatedly determining one or more presence parameters and then updating the presence estimate using the determined one or more presence parameters until a termination criteria is reached; and storing the presence parameters defining a human/non-human presence estimation model.

In a further embodiment of the computer system, the termination criteria comprises one or more of: updating the presence estimate a threshold number of times; a variance of a presence estimate and the updated presence estimate is below a threshold variance amount; and repeatedly determining the one or more presence parameters and then updating the presence estimate for a threshold period of time.

In a further embodiment of the computer system, the security events comprise one or more of: login events; file access events; network traffic related events; firewall events; dynamic host control protocol (DHCP) events; domain name system (DNS) events; code management events; and human resource information system (HRIS) events.

In accordance with the present disclosure there is further provided a method for generating a model for discriminating between human and non-human interactions within a computer network, the method comprising: receiving computer metadata associated with one or more computing devices on the computer network, the computer metadata comprising a plurality of security events, each security event including a unique identifier of a computing device or a user; identifying within the received computer metadata a portion of the computer metadata originating from a particular identifier of a computing device or user; generating an initial presence estimate providing a probability that the portion of the computer metadata for the monitoring period of time was generated by interactions of a human versus non-human actor with the computing device during the monitoring period of time; determining one or more presence parameters from the computer metadata based on the presence estimate; updating the presence estimate using the determined one or more presence parameters; repeatedly determining one or more presence parameters and then updating the presence estimate using the determined one or more presence parameters until a termination criteria is reached; and storing the presence parameters defining a human/non-human presence estimation model.

In a further embodiment of the method, the termination criteria comprises one or more of: updating the presence estimate a threshold number of times; a variance of a presence estimate and the updated presence estimate is below a threshold variance amount; and repeatedly determining the one or more presence parameters and then updating the presence estimate for a threshold period of time.

In accordance with the present disclosure there is further provided a computer system for use in generating a model for discriminating between human and non-human interactions within a computer network, the computer system comprising: a memory for storing instructions and data; and a processing unit for executing instructions stored in the memory, the instructions when executed by the processing unit configuring the computer system to perform a method comprising: receiving computer metadata associated with one or more computing devices on the computer network, the computer metadata comprising a plurality of security events, each security event including a unique identifier of a computing device or a user; identifying within the received computer metadata a portion of the computer metadata originating from a particular identifier of a computing device or user; generating an initial presence estimate providing a probability that the portion of the computer metadata for the monitoring period of time was generated by interactions of a human versus non-human actor with the computing device during the monitoring period of time; determining one or more presence parameters from the computer metadata based on the presence estimate; updating the presence estimate using the determined one or more presence parameters; repeatedly determining one or more presence parameters and then updating the presence estimate using the determined one or more presence parameters until a termination criteria is reached; and storing the presence parameters defining a human/non-human presence estimation model.

In a computer network, such as an organization or corporation's network, it is useful to distinguish between when a human is interacting with a computing device and when a non-human actor is interacting with the computing device. Such a capability could enable, for example, a cybersecurity system to detect when a service account, which should only be used by a non-human actor, has been compromised, and is now being controlled by a human attacker. It could also enable, for example, more precise detection of malicious software by applying malicious software detection models only to non-human actor events and ignoring the human-based "noise" events in the datasets. Further, a cybersecurity system may use multiple different threat detection models for detecting various different possible threats. Some of the detection models may be well suited for applying to data associated with a human's interactions while other ones of the detection models may be well suited for applying to interactions by a non-human actor. By identifying a probability that a human or non-human actor is interacting with the computing device, it is possible to select the appropriate detection model and as such avoid unnecessarily processing the inappropriate detection models.

As described further below, the systems and methods may use a trained human/non-human actor detection model that can be applied to network metadata generated by one or more computers. For monitoring time periods, the human/non-human detection model can provide a probability that a human or a non-human actor was interacting with the computing device, or devices, during each of the individual monitoring time periods. Based on the probability that a human or non-human actor was interacting with the computer during the monitoring time periods, one or more threat detection models can be selected to apply during the monitoring time periods, or other appropriate actions may be performed.

The probability that a human or a non-human agent is interacting with a computer may be determined using a human/non-human actor detection model that may provide a probability estimate of whether it is a human or non-human actor, such as a software agent or component, interacting with or present at the computer. The human/non-human agent detection model (referred to further herein as a HNH model for brevity) may use various techniques, for determining a probability of human vs. non-human interactions.

Performing the human versus non-human agent detection is advantageous and may be used to improve signal-to-noise for subsequent threat risk detection. The precision of subsequent analysis may be increased by applying downstream human-based analysis models or techniques to human events, or events occurring during periods of times that there is a good probability that the events are being generated by a human, and downstream non-human based analysis models or techniques to non-human actor events, or events occurring during periods of time that there is a good probability that the events are being generated by a non-human. The particular probability that may be considered as good may be selected or set for different applications. Methods that may detect or predict when a human is potentially leaving the company by looking for traffic to job search sites can be improved by only looking at web traffic generated by humans. Similarly, methods to detect malicious software based on unusual file activity may be improved by being able to ignore file activity that is the result of a human operator.

Performing the human versus non-human agent detection may also be advantageous for storage requirements. Event-based log data can be voluminous. As a result, if, for example, a system only requires the persistence of human-based data, being able to discriminate between human-events versus non-human actor-generated events, or times when a human is likely interacting with the computer versus time when a non-human is likely interacting with the computer, can result in a significant reduction of storage requirements by discarding those event's generated when it is likely that a human is not interacting with the computer.

The HNH model may use probabilistic, statistical, machine learning based methods to distinguish between human and non-human events, or identifying a probability that a human is interacting with the computing device at particular times. The use of machine-learning based HNH models may advantageously avoid the use of explicit rules and thresholds, which can avoid binary classifications and as such avoid or reduce mis-classifications when the assumptions made by the rules or thresholds do not, or no longer, apply. Further, the lack of rules and thresholds can provide a robust means for human detection that makes evasion of the detection more difficult.

The HNH model may be provided in numerous ways. For example, the HNH model may use an activity uniformity model that analyses a dataset's events' (or selection of events) timestamp can be used to estimate the probability of the events being the result of a non-human, based on the uniformity of the activity. As an example, if the selected events for a given entity occur during all hours of the day, or all days of the week, then it would be unlikely that the entity behind these events is a human. The uniformity of timestamps can be quantified using calculations such as entropy, discrete uniform distribution, or $\chi^2$ and be used to estimate that probability.

Further to the activity uniformity model, the HNH model may be based on activity repeatability or periodicity. For example, the HNH model may use an activity uniformity model that analyzes a dataset's events' (or selection of events) timestamp to estimate a probability of the events being the result of a non-human, based on the repeatability or periodicity of the activity. As an example, if the selected events for a given entity always occurs at exactly 12:30 am every weekend, then it would be unlikely that the entity behind the events is a human, and likely that it is the result of a non-human agent such as a scheduled program.

In addition to the timestamp-based HNH models, the HNH models may be trained on a dataset using either supervised, unsupervised or semi-supervised training methods. Within a dataset, there may be indicators that are more strongly associated with human interactions such as keystroke logs, applications used, certain types of activities on data sources, use of the "delete" key, the randomness of time between operations, etc., while other indicators may be more strongly associated with non-human actors, such as the number of domain controllers accessed, the process name, the application being executed, the event's time of day, etc. By labeling such dataset event sets "human" or "non-human", a supervised classifier models can be trained on the dataset to discriminate between humans or non-human actors. For example, a logistic regression model on labeled data, command line log files with the commands entered and syntax error counts may be used to distinguish between script activity versus human operator commands. Additionally or alternatively, chi-square automatic interaction detection (CHAID) regression tree analysis on a set of process characteristics, such as process name, start/stop time, sub-processes, resultant I/O activity, resultant registry activity, from process logs may be used to distinguish between executables run by a human versus malware that is masquerading as an executable being run by a human.

Supervised modeling methods may provide acceptable results; however, they require a known set of data for training, that is a dataset that is labelled as human or non-human is required for training. Unsupervised modeling methods can be used to train an HNH model without requiring labelling of data in a training set, or semi-supervised modeling methods can be used to train an HNH model with a very small set of labeled data. Without the benefit of labeled training data sets, online, unsupervised or semi-supervised modeling methods, such as expectation-maximization or clustering, may be performed directly on the dataset in the system environment to discriminate between humans, non-humans, and potentially mixed events. For example, a clustering model using clustering of predictive indicators from endpoint data may discriminate between three clusters: human only, non-human actors only, and mixed events. Additionally or alternatively, expectation-maximization (EM) on NetFlow data values or other data sets may be used to estimate indicators of human versus non-human, and whether the human or non-human agent were active, or interacting with the computer, at a given time.

For the HNH modelling methods above, the combination of multiple datasets and multiple methods together may also be employed to increase accuracy. For example, employee badge activity logs may provide evidence that a human is physically at the computer to help corroborate a determination that it is likely that a human is interacting with a computer. The HNH model training and use described above for identifying potentially human generated interaction events in contrast to potentially non-human actor generated interaction events may be applied to help identify potential security threat risks.

FIG. 1 depicts a network environment in which human vs non-human actor interactions may be distinguished. The environment 100 may comprise an organizational network 102. The organizational network 102 is depicted as being located at a single location; however the organization may have multiple physical and/or virtual locations. The organizational network 102 may include a plurality of computing devices 104a, 104b, 104c. The computing devices, depicted as computing devices 104a, 104b, may be used by humans 106a, 106b, or the computing device may be used by a non-human actor depicted as software agent 108. The network may also be accessible by external users' 134a using computing device 134. In addition to the computers 104a-104c, the network 102 may further include one or more servers 110 or other computing devices. Regardless of whether a human or non-human actor is interacting with the computing device and is responsible for generating network data, the computing devices send and receive data over a network, depicted as a router 112 connecting the plurality of computers 104a-104c and server 110 together. The organizational network 102 may further include one or more firewalls 114 for controlling data flows to and from the organization's network. The organizational network 102 may be connected to external networks 116 such as the Internet. The firewall 114 may restrict access to the organizational network 102 from the Internet 116 as well as controlling access to the Internet from the organizational network 102. The firewall 114 may also be used to control internal network traffic on the organizational network 102. It will be appreciated that the organizational network 102 depicted in FIG. 1 is a simplified network architecture and in practice an organization's network may include hundreds, thousands, or more of individual computers with numerous different servers as well as other computing devices such as printers, VoIP phones, wireless access points, etc. The servers of the network 102 may provide various functionality to the organization such as authentication, authorization and accounting functionality for controlling a user's access to various computing resources. The functionality may be provided for example by an Active Directory server. Further functionality may include file servers for providing storage and access to documents for users as well as router functionality for controlling the flow of data between the various computing devices. Each action performed by a computer, whether the action is due to human interactions with the computer or from a non-human actor interacting with the computer, may be associated with log data as well as network metadata. As an example, each network request may be stored as NetFlow data that stores an indication of each data request sent or received between network locations. The NetFlow data may comprise a source identifier, a destination identifier as well as a port and protocol identifiers, as well as a time stamp. Additional actions may also be stored such as a user accessing stored files, along with additional information such as an amount of data accessed. Further network data may be logged such as network login attempts, whether successful or unsuccessful. Further data that may be used may include various logged data from computing devices, network devices, and other sensors. The data may be logged at varying levels of verbosity and may include, for example, commands run by a computing device, keystrokes at a computing device, source code log files, sensor logs, etc. Regardless of the particular data that is available from the organizational network 102, it may be processed in order to determine whether events or actions associated with one or more of the computers are likely to be a result of human interactions with the computer or a results of a non-human agent's interactions with the computer.

A security server 118 processes security related data including interaction metadata from a computer in order to determine a probability that the data, or at least a portion of the data was generated by a human interacting with the computer or by a non-human agent interacting with computer. The security server 118 is capable of accessing the organization's security related data, which as described above may include various data sources such as Active Directory logs, NetFlow metadata, file access logs, firewall logs, etc. The security server 118 is depicted as being external to the organizational network 102; however, the security server 118 could be located within the organizational network 102.

The security server 118 comprises a central processing unit (CPU) 120 that executes instructions. The instructions that are executed by the CPU 120, along with other data, may be stored in a memory unit 122 operatively connected to the CPU. The security server 118 may further comprise non-volatile (NV) storage 124 that retain their stored data even in the absence of applied power. The security server may further comprise one or more input output (I/O) interfaces 126 for operatively connecting one or more input and/or output devices to the CPU 120.

When the instructions stored in the memory unit 122 are executed by the CPU 120, the security server, or one or more servers if the described functionality is distributed across multiple servers, is configured to provide various functionality 128 including threat risk monitoring functionality 130. The threat risk monitoring functionality 130 may be used to determine and monitor various potential security threat risks within the organization. For example, the threat risk monitoring functionality 130 may provide an indication that a particular user account has been compromised and could be used for nefarious purposes. The threat risk monitoring functionality 130 may include Human/Non-Human actor detection functionality 132. As described above, and described in further detail below, the human/non-human agent detection processes security related data pertaining to interaction with a computing device, including network traffic metadata, file access metadata, code management system, internal or external network resources, and attempts to identify whether portions of the security related data is a result of a human interacting with one or more computers or a is a result of a non-human agent, such as a computer program, interacting with one or more computers. The detection may identify individual metadata associated with human activity or may identify subsets of the network metadata, such as the network metadata associated with a particular computer over a monitoring period of time, that were likely generated by human actions.

The human/non-human detection functionality 132 may process metadata of interactions from a particular computing device in order to determine if the computer metadata from the computer is due to a human. Additionally or alternatively, the human/non-human detection functionality 132 may aggregate the metadata from multiple computers in order to process the network traffic associated with a particular user account, or system account. That is, a single user account may be logged into multiple computers, either at the same time or at different times. The metadata generated by the different computers for the time period when the particular user account under consideration may be aggregated together and processed to determine if the traffic from the multiple computers was likely generated from a human or non-human agent.

Figure 2:
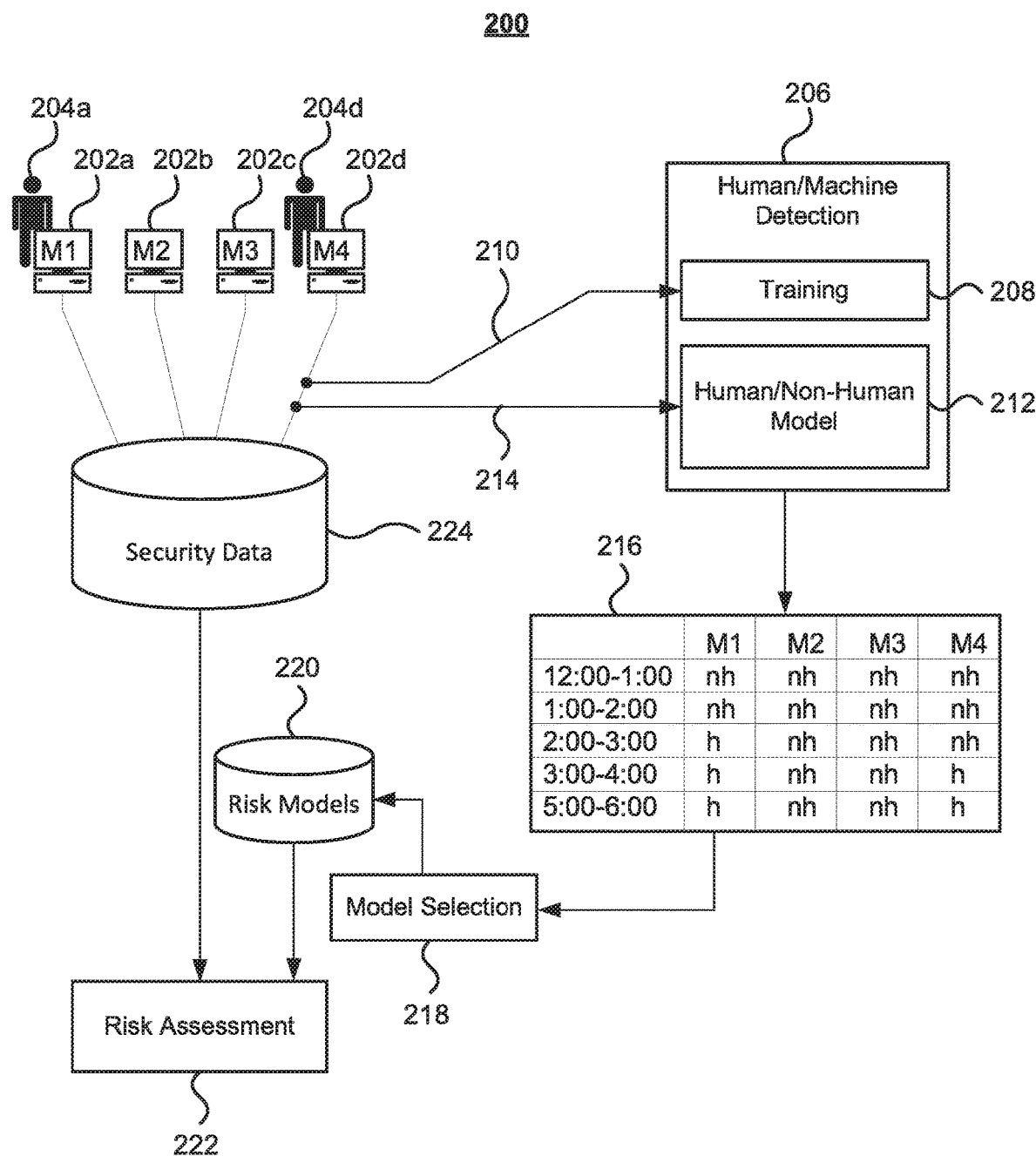
FIG. 2 depicts a system for training and using a human/non-human agent scoring model.

FIG. 2 depicts a system for training and using a human/non-human agent estimation model. The system 200 includes a plurality of networked computers 202a-202d (referred to collectively as networked computers 202). One or more humans 204a, 204d may be interacting with respective ones of the networked computers 202 at any particular point in time. The human's interactions with the computer will generate various events that are stored or otherwise logged and can be subsequently processed. The computers 202 may also interact with non-human agents which will also generate various security related events. Although described separately, the networked computers 202 may generate security related data as a result of a human and a non-human agent simultaneously.

Human/non-human detection functionality 206 attempts to determine if events, or a set of events, were likely to have been generated by a human or a non-human actor. The human/non-human detection functionality 206 may include model training functionality 208 that receives computer metadata 210 and uses the received data for training a model. The received data may be explicitly identified as being generated by a human or non-human actor, in which case the training functionality 208 may perform a type of supervised learning to train a human/non-human model 212. Alternatively, if the computer metadata does not include human/non-human labels, and as such supervised learning is not possible, the training functionality 208 may use unsupervised training techniques in order to train the human/non-human model 212.

Once trained, the human/non-human model 212 may be used to process network data 214 generated by one or more of the networked computers 202. The human/non-human model may provide a presence probability for a monitoring time period for a computing device. As depicted in table 216, different monitoring time periods and computers are provided with a label indicative of whether or not it is likely that a human was interacting with the computer during the monitoring time period. As depicted, between 12:00 and 1:00 the human/non-human model 212 determines a non-human actor, which may be a computer program, was interacting with the computer and so labels the time and computer with a label 'nh'. Similarly, during monitoring time period 2:00 and 3:00 the human/non-human model 212 labels the computer M1 with a human label 'h'. Although described as providing a label as either a human or a non-human actor, the labelling may provide a presence probability that the data associated with the computer metadata for the monitoring period of time was generated by a human versus a non-human agent interacting with the computing device during the monitoring period of time. For example, rather than simply labelling a time period and computer with a label 'h', the model may provide a label "h:0.9" indicative that there is a 90% probability that a human was interacting with the computer.

The human/non-human labelling 216 may be used to improve threat risk assessment or other improvements such as reducing log storage requirements. The labelling 216 may be provided to model selection functionality 218 that selects one or more risk models 220 to apply to security related data 224 during the monitoring time period. For example, if it is likely that a human is interacting with the computer during the time between 1:00 and 2:00, a model for detecting potentially aberrant human behaviour. Further risk models that can be selected and applied by risk assessment functionality 222 may include for example detecting that a system account, which should only be associated with non-human actor interactions, is being used by a human.

Figure 3:
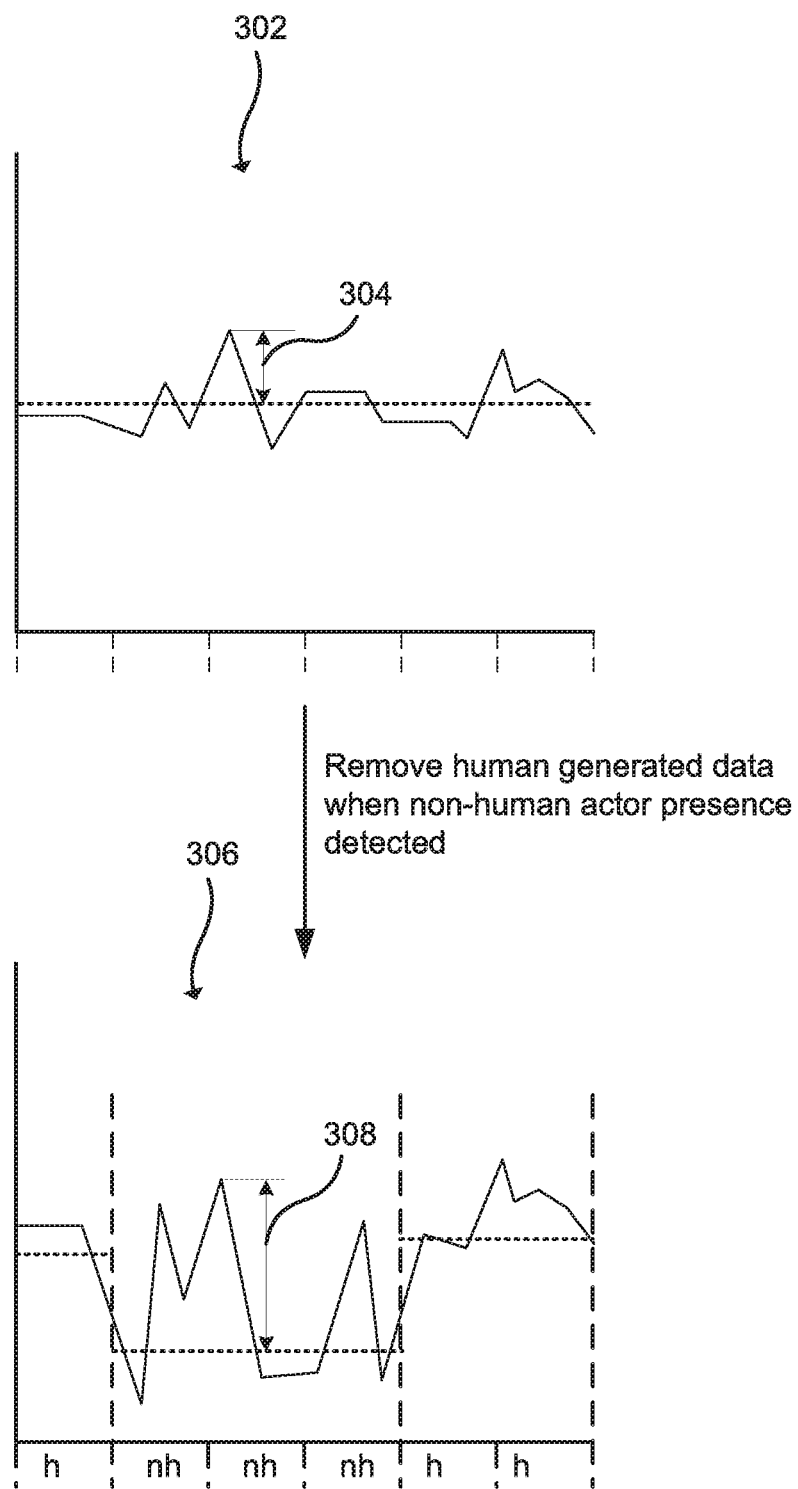
FIG. 3 depicts illustrative computer interaction metadata graphs with human computer metadata included and excluded for periods when a human is interacting with a computing device and is not interacting with the computing device respectively.

FIG. 3 depicts illustrative computer metadata graphs with human generated interaction included and excluded for periods when a human is interacting with a computing device and is not interacting with the computing device respectively. As depicted in graph 302, without classifying the data as being human or non-human actor generated, the signal to noise ratio 304 may be relatively small. In contrast, when labeled and unrelated traffic is removed, for example removing human generated computer metadata when it is determined that the interaction is primarily non-human actor generated, as depicted in graph 306, the signal to noise ratio 308 may be improved which may provide more accurate results in the risk threat analysis.

Figure 4:
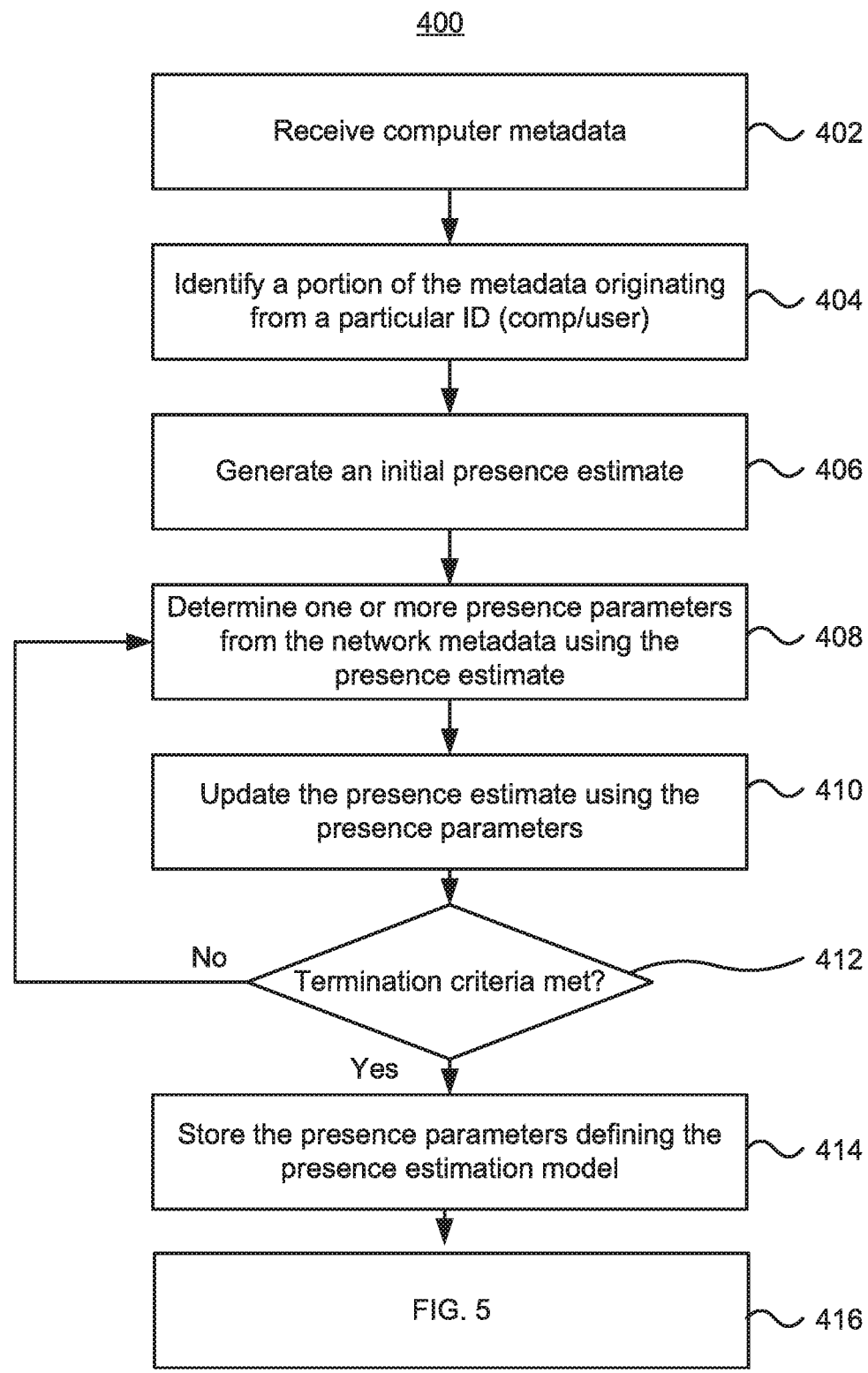
FIG. 4 depicts a method of training a human/non-human agent scoring model.

FIG. 4 depicts a method of training a human/non-human actor scoring model. Although various training methods for the human/non-human actor model are possible, the method 400 is described with regard to an EM training method. The method 400 receives computer metadata (402) comprising events. The received computer metadata may explicitly identify the security events, such as sets of Source:Destination:Protocol:Time data, or may implicitly identify the security events, such as packet data that can be processed to generate the corresponding sets of Source:Destination:Protocol:Time data. Although described as using computer metadata, the training may use the security events, which may be determined from the metadata in advance or during the training. It will be appreciated that the human/non-human detector models may be trained on different types of security events, including for example, security events based on computer metadata, security events based on login data, security events based on file access. The security events do not necessarily indicate a security threat, but rather are events that are processed in order to identify potential security threats. For example, security events may be generated for successful and unsuccessful login attempts, which may be indicative of a security threat such as a user account being compromised, or may be normal activity, such as a user mistyping their password. Further, although referred to as security events, the events do not need to be security related, but rather may be used, for example by the current system and methods to improve security. The events may include a wide variety of computer data associated with a computer device. Events may include, for example, login events, file access events, network traffic related events, firewall events, dynamic host control protocol (DHCP) events, domain name system (DNS) events, code management events, and/or human resource information system (HRIS) events.

The computer metadata may include metadata for one or more computers and may be associated with one or more accounts. The computer metadata may be generated over a time period, such as an hour, a day, a week, a month, etc. A portion of the computer metadata is identified associated with a particular identifier (ID) (404). The particular ID may be a computer ID, such as a computer name, IP address, MAC address, etc., or may be a user ID. If the received computer metadata is for a long period of time then a monitoring period of time, the method 400 may further select the computer metadata for a monitoring period of time, which may be, for example, between a few minutes to a few hours.

An initial estimate or seed value is generated for the presence of a human (406) for the particular ID and the monitoring period of time. The presence estimate provides a probability that a human, or non-human, is interacting with a computer device or devices during the monitoring period of time. The initial presence estimate may be generated based on the portion of the metadata. For example, if the portion of the metadata includes a particular security event, such as an interactive login, the initial presence estimate may be generated as being a human. It is noted that the initial presence estimate does not need to be correct. The initial presence estimate may be generated as a random number or from the metadata. For example, initial probabilities that a certain port and protocol is active while a human is interacting with a computer can be used to generate the initial presence estimate from the metadata. Although a random number may be used as an initial presence estimate, the better the initial estimate of the presence is, the faster the training may converge to an acceptable estimate. An example of a table of initial probability seed values or estimates is provided below.

TABLE 1

Table of initial seed values for EM training

| PORT | PROTOCOL | ACTIVE PROBABILITY |
|---|---|---|
| 143 | TCP | 0.67 |
| 25 | TCP | 0.99 |
| 2525 | TCP | 1 |
| 2526 | TCP | 0.99 |
| 465 | TCP | 0.99 |
| 587 | TCP | 0.95 |
| 993 | TCP | 0.51 |
| 53 | UDP | 0.87 |
| 22 | TCP | 0.71 |
| 135 | TCP | 0.68 |
| 445 | TCP | 0.75 |
| 3389 | TCP | 0.63 |
| 5900 | TCP | 0.58 |
| 548 | TCP | 0.62 |
| 2049 | TCP | 0.59 |
| 2049 | UDP | 0.58 |

Using the initial presence estimate, one or more presence parameters are determined from the computer metadata using the presence estimate (408). The one or more presence parameters are parameters that can be used in predicting the presence estimate. Once the one or more presence parameters are determined, the presence estimate is updated using the presence parameters (410). That is, the one or more presence parameters are used to determine an updated presence estimate. Once the presence estimate is updated, it is determined if a termination criteria is met (412). The termination criteria may be various criteria, such as a number of iterations, a variance between previous and updated presence estimates, or other criteria. If the termination criteria is not met (No at 412), one or more presence parameters are again determined using the updated presence estimate (408). If the termination criteria is met (Yes at 412), the presence parameters, which define a human/non-human detection model, are stored (414). Once trained as described in steps 402-414, the detection model may then be used as described further with reference to FIG. 5 (416). In the case of EM on NetFlow data, an example likelihood function may be to use Naïve Bayes to estimate the probability of each recorded network application being conditionally independent of each other depending on whether a human is active or not, and a termination criteria may be a maximum number of iterations or arriving at the same presence estimate two times in a row.

Figure 5:
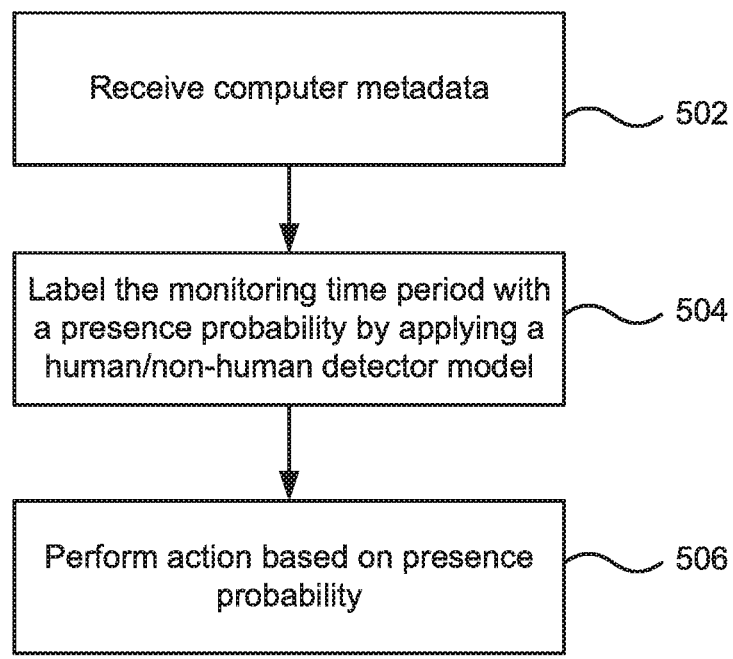
FIG. 5 depicts a method of distinguishing human from a non-human agent interactions from computer metadata.

FIG. 5 depicts a method of distinguishing human from a non-human actor interactions from the computer metadata. The method 500 receives computer metadata (502). As described above, the metadata comprises security events. The method 500 labels a particular ID, for either a computer device or account, and monitoring period of time with a presence probability by applying a human/non-human detector model (504) to the computer metadata occurring during the monitoring period of time and associated with the particular ID. The human/non-human detector model may be applied to all of the particular IDs present in the computer metadata. Accordingly, the labelling may provide an indication of a probability that interactions occurring at a particular time and at a computer device, or devices, are from a human or non-human actor. Once the labelling is complete, an action may be performed based on the presence probability (506). The presence probability may be used, for example to filter data either for storage or subsequent use with various security threat models, or use in selecting security threat models to apply. Example uses are described further below with reference to FIGS. 6-8.

Figure 6:
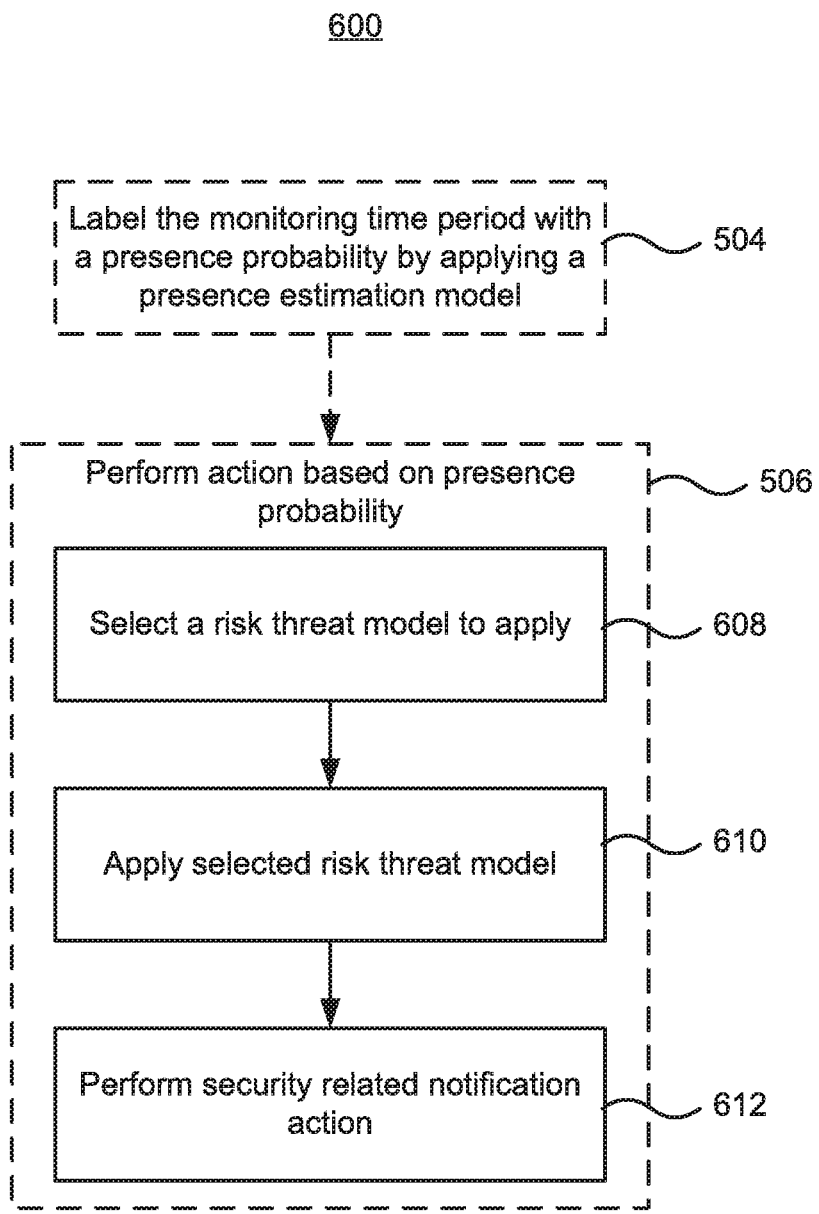
FIG. 6 depicts a further method of distinguishing human from a non-human actor interactions from computer interaction metadata, and providing security notifications.

FIG. 6 depicts a further method of distinguishing human from a non-human actor interactions from computer metadata, and providing security notifications. The method 600 labels computer metadata (502) and performs an action (506) as described above. The action may include selecting a risk threat model to apply (608). As an example, a threat model for use in detecting non-human threats may be selected if the portion of the metadata has a high probability that the metadata is associated with a non-human actor. Non-human threat models may include models for detecting command and control communications, virus and or malware detection models, ransomware detection models, script detection models, bot detection models as well as other non-human threat detection models. Human threat models may include insider threat models, data exfiltration models, industrial espionage detection models, as well as other human threat detection models. Once the appropriate risk threat model is selected, the model is applied (610). The model may be applied to a dataset that includes the computer metadata used in determining a presence estimate, however, the dataset the model is applied to does not need to be limited to the computer metadata. Once the risk threat model is applied, a security related notification action is taken (612) based on the results of the applied risk threat model. The notification action may take various forms, including SMS text messages, emails or instant messages to security personnel, configure an access system to lock access of a user or computer, distributing software for further data collection to a computer, user or population as well as modifying a verbosity of monitoring logs.

Figure 7:
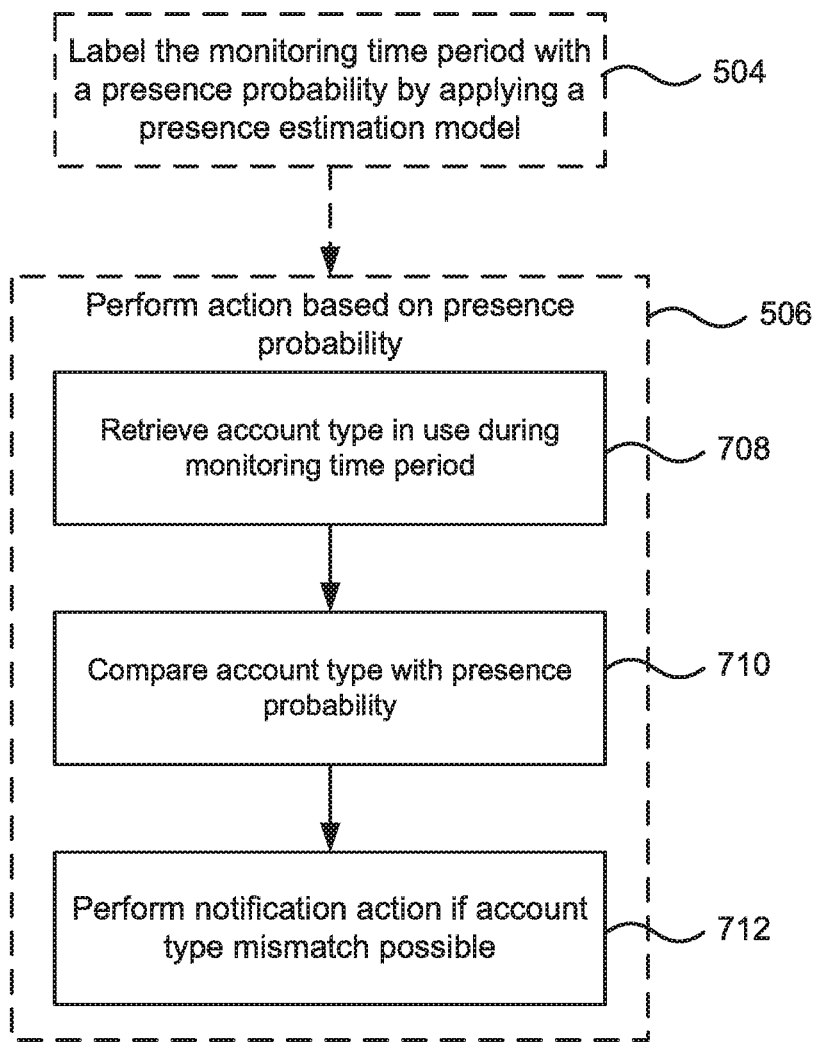
FIG. 7 depicts a further method of distinguishing human from a non-human actor interactions from computer interaction metadata, and providing security notifications.

FIG. 7 depicts a further method of distinguishing human from a non-human actor interactions from computer metadata, and providing security notifications. The method 700 labels computer metadata (502) and performs an action (506) as described above. The action may include retrieving an account type that was in use during a monitoring time period (708). The account type may be, for example, a user account or a system account. The account type may be compared with the determined presence probability (710) to determine if the activity indicated by the presence probability is expected for the account type. For example, a system account should not be associated with a presence probability indicating that the interactions were from a human. The security practitioner will appreciate, for example, that Windows service (system) accounts are a desirable target for compromise by human attackers. Based on the comparison, a notification action is taken if an account type mismatch is possible (712). For example a mismatch is possible when a user account is associated with a high probability of non-human interactions or a system account is associated with a high probability of human interactions. What is considered as a high probability may depend upon the account type, or the particular account. For example, network traffic from a computer during a period of time when a user is logged in on the computer may be expected to have a certain level of non-human actor activity and as such a mismatch may be possible if the human interaction probability is less than, for example, 65%. In contrast network traffic from a printer or a particular system account may be expected to only be a result of non-human interactions and as such a mismatch may be possible if the non-human interaction probability is less than, for example, 95%. As described above, the notification action may take various forms, including SMS text messages, emails or instant messages to security personnel, configure an access system to lock access of a user or computer, distributing software for further data collection to a computer, user or population as well as modifying a verbosity of monitoring logs.

Figure 8:
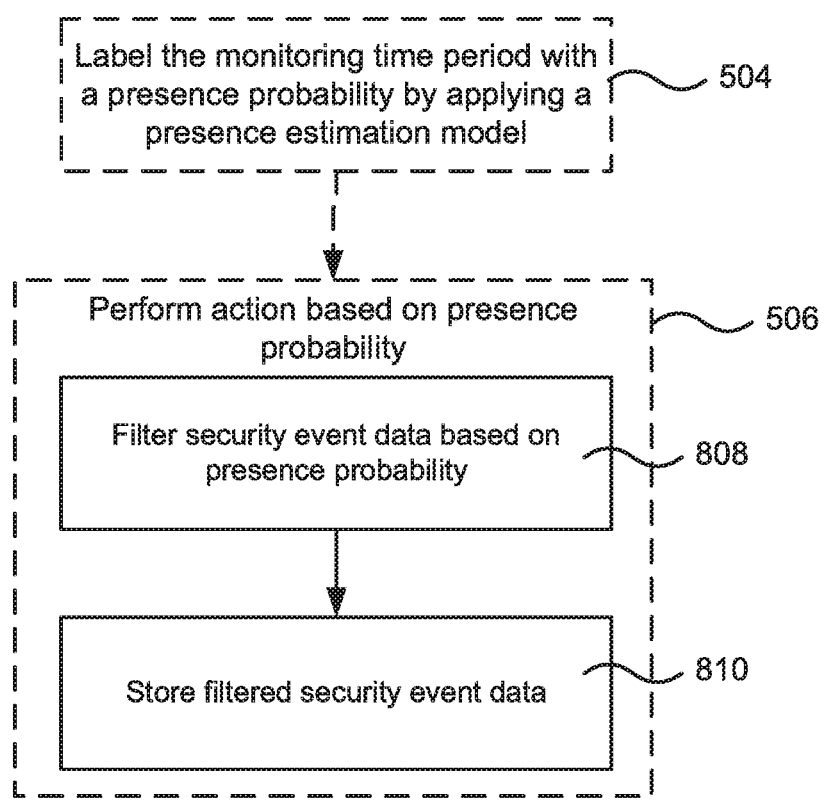
FIG. 8 depicts a further method of distinguishing human from a non-human actor interactions from computer interaction metadata, and storing security event data.

FIG. 8 depicts a further method of distinguishing human from a non-human actor interactions from computer metadata, and storing security event data. The method 800 labels computer metadata (502) and performs an action (506) as described above. The action may include filtering security event data, or the computer metadata used in determining the security event data, based on presence probability (808). For example, the data may be filtered to remove data from monitoring time periods with a high probability of non-human interactions, and as such leaving data that has a high probability of being generated by human interactions. The filtered security data may that be stored (810). By filtering the security data based on the presence probability, it is possible to store only the security event data that may be of interest. Although the above method 800 assumes that human interactions are of interest for long term storage, the opposite may be desirable. Alternatively, the filtered data may be stored in one location and the filtered-out data may be stored in a second location.

Although certain components and steps have been described, it is contemplated that individually described components, as well as steps, may be combined together into fewer components or steps or the steps may be performed sequentially, non-sequentially or concurrently. Further, although described above as occurring in a particular order, one of ordinary skill in the art having regard to the current teachings will appreciate that the particular order of certain steps relative to other steps may be changed. Similarly, individual components or steps may be provided by a plurality of components or steps. One of ordinary skill in the art having regard to the current teachings will appreciate that the system and method described herein may be provided by various combinations of software, firmware and/or hardware, other than the specific implementations described herein as illustrative examples.

In various embodiments devices, systems and methods described herein are implemented using one or more components or modules to perform the steps corresponding to one or more methods. Such components or modules may be implemented using software executed by computing hardware. In some embodiments each component or module is implemented by executing stored instructions to configure a general purpose processor to provide the component or module functionality. Many of the above described methods or method steps can be implemented using machine executable instructions, such as software, included in a machine readable medium such as a memory device, e.g., RAM, CD, DVD, flash memory, disk, etc. to control a machine, e.g., general purpose computer with or without additional hardware, to implement all or portions of the above described methods in one or more physical computer systems. Accordingly, among other things, various embodiments are directed to a machine-readable medium e.g., a non-transitory computer readable medium, including machine executable instructions for causing a machine, e.g., processor and/or associated hardware, to perform one or more or all of the steps of the above-described method(s). Some embodiments are directed to a device including a processor configured to implement one, multiple or all of the steps of one or more methods of the invention.

Numerous additional variations on the methods and apparatus of the various embodiments described above will be apparent to those skilled in the art in view of the above description. Such variations are to be considered within the scope.

What is claimed is:

1. A method for discriminating between human and non-human interactions with computing devices on a computer network, the method comprising:
    receiving computer metadata associated with one or more computing devices on the computer network, the computer metadata comprising a plurality of security events, each security event of the plurality of security events including a unique identifier of a computing device of the one or more computing devices or a user;
    for a monitoring time period, determining a presence probability by applying a presence estimation model to at least a portion of the computer metadata associated with a particular unique identifier of the computing device of the one or more computing devices or the user, the presence estimation model providing the presence probability that the at least the portion of the computer metadata for the monitoring time period was generated by interactions of a human actor versus a non-human actor;
    selecting, from among a plurality of different risk threat detection models, an appropriate risk threat detection model to process the at least a portion of the computer metadata based on the determined presence probability, wherein each of the plurality of different risk threat detection models outputs a threat risk score associated with the computing device, the threat risk score indicating a potential security threat, wherein the plurality of different risk threat detection models comprise a first set of risk threat detection models for use in detecting non-human threats and a second set of risk threat detection models for use in detecting human threats, wherein the first set of risk threat detection models comprises one or more of a model for detecting command and control communication threats, virus and/or malware model, ransomware detection model, script detection model, and bot detection model, and wherein the second set of risk threat detection models comprises one or more of an insider threat model, a data exfiltration model, and an industrial espionage detection model; and
    performing an action based on an output of the appropriate risk threat detection model.

2. The method of claim 1, wherein the output comprises a threat risk score of the appropriate risk threat detection model and wherein the action comprises
    providing a security related notification according to the threat risk score.

3. The method of claim 1, wherein performing the action comprises:
    retrieving an account type in use during the monitoring time period, the account type being a user account associated with the human actor or a system account associated with the non-human actor;
    comparing an account type with the determined presence probability;
    when there is at least a threshold probability that the account type does not match a type of actor associated with the determined presence probability determining that an account type mismatch exists; and
    performing a notification action that an account type mismatch exists.

4. The method of claim 1, wherein performing the action comprises:
    filtering security event data based on the determined presence probability to provide first security event data comprising security event data associated with a human or non-human actor type indicated by the determined presence probability and second security event data comprising security event data associated with the other of the human or non-human actor type; and
    storing the first security event data but not the second security event data at a first memory location.

5. The method of claim 1, wherein performing the action comprises:
    filtering security event data based on the determined presence probability to provide first security event data comprising security event data associated with a human or non-human actor type indicated by the determined presence probability and second security event data comprising security event data associated with the other of the human or non-human actor type; and
    applying the selected appropriate risk threat detection model to the first security data but not the second security event data, wherein the second security event data is unrelated to the first security event data.

6. The method of claim 1, wherein the determined presence probability indicates the non-human actor during the monitoring time period and further comprising:
    generating the presence estimation model using one or more of:
    supervised training; unsupervised training; and semi-supervised training;
    filtering security event data based on the determined presence probability to provide first security event data comprising security event data associated with a non-human actor type and second security event data comprising security event data associated with a human actor type; and
    applying the selected appropriate risk threat detection model to the first security event data but not the second security event data.

7. The method of claim 1, further comprising generating the presence estimation model comprising:
- identifying within the received computer metadata a portion of the computer metadata originating from a particular identifier of a computing device or user;
- generating an initial presence estimate providing a probability that the portion of the computer metadata for the monitoring time period was generated by interactions of the human actor versus non-human actor with the computing device during the monitoring time period;
- determining one or more presence parameters from the computer metadata based on the initial presence estimate;
- updating a presence estimate using the determined one or more presence parameters;
- repeatedly determining one or more presence parameters and then updating the presence estimate using the repeatedly determined one or more presence parameters until a termination criteria is reached; and
- storing the determined and repeatedly determined one or more presence parameters defining a human/non-human presence estimation model.

8. The method of claim of claim 7, wherein the termination criteria comprises one or more of:
- updating the presence estimate a threshold number of times;
- a variance of a presence estimate and the updated presence estimate is below a threshold variance amount; and
- repeatedly determining the one or more presence parameters and then updating the presence estimate for a threshold period of time.

9. The method of claim 1, wherein the security events comprise one or more of:
- login events;
- file access events;
- network traffic related events;
- firewall events;
- dynamic host control protocol (DHCP) events;
- domain name system (DNS) events;
- code management events; and
- human resource information system (HRIS) events and further comprising:
- based on the determined presence probability, associating a label with one or more of the monitoring time period and computing device, the label indicating whether or not it is more likely that the human actor or non-human actor was interacting with the computing device.

10. A computer system for use in discriminating between human and non-human interactions with a computer device on a computer network, the computer system comprising:
- a memory for storing instructions and data; and
- a processing unit for executing instructions stored in the memory, the instructions when executed by the processing unit configuring the computer system to perform a method comprising:
  - receiving computer metadata associated with one or more computing devices on the computer network, the computer metadata comprising a plurality of security events, each security event of the plurality of security events, including a unique identifier of a computing device of the one or more computing devices or a user;
  - for a monitoring period of time, determining a presence probability by applying a presence estimation model to at least a portion of the computer metadata associated with a particular unique identifier of the computing device of the one or more computing devices or the user, the presence estimation model providing the presence probability that the at least a portion of the computer metadata for the monitoring period of time was generated by interactions of a human actor versus a non-human actor;
  - selecting, from among a plurality of different risk threat detection models, an appropriate risk threat detection model to process the at least a portion of the computer metadata based on the determined presence probability, wherein each of the plurality of different risk threat detection models outputs a threat risk score associated with the computing device, the threat risk score indicating a potential security threat; and
  - performing an action based on the threat risk score of the appropriate risk threat detection model, the action comprising:
    - retrieving an account type in use during the monitoring period of time, the account type being a user account associated with the human actor or a system account associated with the non-human actor;
    - comparing an account type with the determined presence probability;
    - when there is at least a threshold probability that the account type does not match a type of the actor associated with the determined presence probability, determining that an account type mismatch exists; and
    - performing a notification action that an account type mismatch exists.

11. The computer system of claim 10, wherein the action comprises:
- providing a security related notification according to the threat risk score.

12. The computer system of claim 10, wherein the plurality of different risk threat detection models comprise a first set of risk threat detection models for use in detecting non-human threats and a second set of risk threat detection models for use in detecting human threats, wherein the first set of risk threat detection models comprises one or more of a model for detecting command and control communication threats, virus and/or malware model, ransomware detection model, script detection model, and bot detection model, and wherein the second set of risk threat detection models comprises one or more of an insider threat model, a data exfiltration model, an industrial espionage detection model.

13. The computer system of claim 10, wherein performing the action comprises:
- filtering security event data based on the determined presence probability to provide first security event data comprising security event data associated with a human or non-human actor type indicated by the determined presence probability and second security event data comprising security event data associated with the other of the human or non-human actor type; and
- storing the first security event data but not the second security event data at a first memory location.

14. The computer system of claim 10, wherein performing the action comprises:
- filtering security event data based on the determined presence probability to provide first security event data comprising security event data associated with a human or non-human actor type indicated by the determined presence probability and second security event data comprising security event data associated with the other of the human or non-human actor type; and
- applying the selected appropriate risk threat detection model to the first security events data but not the second security event data, wherein the second security event data is unrelated to the first security event data.

15. The computer system of claim 10, wherein the determined presence probability indicates the non-human actor during the monitoring period of time and wherein the executed instructions further configure the computer system to generate the presence estimation model using one or more of: supervised training; unsupervised training; and semi-supervised training; to filter security event data based on the determined presence probability to provide first security event data comprising security event data associated with a non-human actor type and second security event data comprising security event data associated with a human actor type; and apply the selected appropriate risk threat detection model to the first security event data but not the second security event data.

16. The computer system of claim 10, wherein the executed instructions further configure the computer system to generate the presence estimation model by:
identifying within the received computer metadata a portion of the computer metadata originating from a particular identifier of a computing device or user;
generating an initial presence estimate providing a probability that the portion of the computer metadata for the monitoring period of time was generated by interactions of the human actor versus non-human actor with the computing device during the monitoring period of time;
determining one or more presence parameters from the computer metadata based on the initial presence estimate;
updating a presence estimate using the determined one or more presence parameters;
repeatedly determining one or more presence parameters and then updating the presence estimate using the determined and repeatedly determined one or more presence parameters until a termination criteria is reached; and
storing the determined and repeatedly determined presence parameters defining a human/non-human presence estimation model.

17. The computer system of claim 16, wherein the termination criteria comprises one or more of:
updating the presence estimate a threshold number of times;
a variance of a presence estimate and the updated presence estimate is below a threshold variance amount; and
repeatedly determining the one or more presence parameters and then updating the presence estimate for a threshold period of time.

18. The computer system of claim 10, wherein the security events comprise one or more of:
login events;
file access events;
network traffic related events;
firewall events;
dynamic host control protocol (DHCP) events;
domain name system (DNS) events;
code management events; and
human resource information system (HRIS) events and wherein the executed instructions further configure the computer system, based on the determined presence probability, to associate a label with one or more of the monitoring period of time and computing device, the label indicating whether or not it is more likely that a human actor or non-human actor was interacting with the computing device.

19. A method for generating a model for discriminating between human and non-human interactions within a computer network, the method comprising:
receiving computer metadata associated with one or more computing devices on the computer network, the computer metadata comprising a plurality of security events, each security event of the plurality of security events including a unique identifier of a computing device of the one or more computing devices or a user;
identifying within the received computer metadata a portion of the received computer metadata originating from a particular unique identifier of the computing device or the user;
generating an initial presence estimate providing a probability that the portion of the received computer metadata for a monitoring period of time was generated by interactions of a human actor versus non-human actor with the computing device during the monitoring period of time;
determining one or more presence parameters from the received computer metadata based on the initial presence estimate;
updating a presence estimate using the determined one or more presence parameters;
repeatedly determining one or more presence parameters and then updating the presence estimate using the determined and repeatedly determined one or more presence parameters until a termination criteria is reached; and
storing the determined and repeatedly determined presence parameters defining a human/non-human presence estimation model.

20. The method of claim of claim 19, wherein the termination criteria comprises one or more of:
updating the presence estimate a threshold number of times;
a variance of a presence estimate and the updated presence estimate is below a threshold variance amount; and
repeatedly determining the one or more presence parameters and then updating the presence estimate for a threshold period of time.

* * * * *